Patented Nov. 10, 1925.

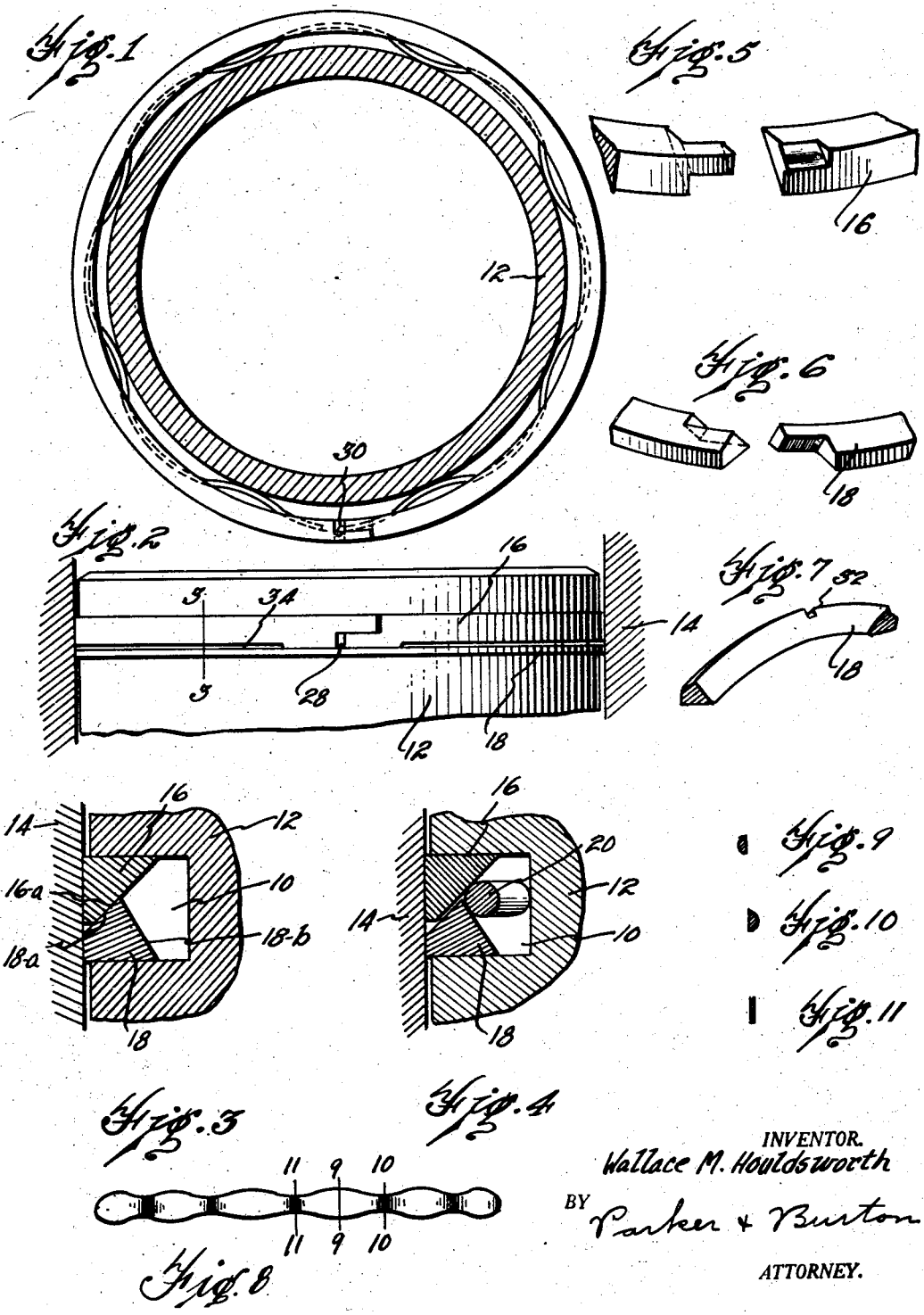

1,560,818

UNITED STATES PATENT OFFICE.

WALLACE MATER HOULDSWORTH, OF ROYAL OAK, MICHIGAN.

PISTON PACKING.

Application filed May 19, 1924. Serial No. 714,281.

*To all whom it may concern:*

Be it known that I, WALLACE M. HOULDSWORTH, a citizen of the United States, residing at Royal Oak, county of Oakland, State of Michigan, have invented a certain new and useful Improvement in Piston Packings, and declare the following to be a full, clear, and exact description of the same, such as will enable others skilled in the art to which it pertains to make and use the same, reference being had to the accompanying drawings, which form a part of this specification.

My invention relates to improvements in piston packing.

An object is to provide improved piston packing adapted to retain compression within the cylinder in which the piston is working, prevent oil pumping, and stabilize the piston in the cylinder to obviate what is commonly termed piston slap.

My improved packing is so constructed and arranged in the provided groove in the piston as to seal the joint formed between the piston and the cylinder wall and the joints formed between the packing and the side walls of the groove in the piston in which the packing is disposed. The packing is of such a character as to conform quickly and readily to an irregular or out-of-round condition of the cylinder, being, therefore, particularly suited for use as replacement packing in worn cylinders.

I provide co-operating ring sections held against relative rotation by an expansible locating member, which member also exerts pressure on the packing rings to hold them outwardly against the cylinder and laterally against the side walls of the groove. This expansible member is so formed as to exert substantially uniform pressure upon the packing rings throughout their circumference.

My improved packing consists of a plurality, preferably a pair, of co-operating ring sections having conical meeting faces and conical inner faces which intersect to form a grooved inner face for the combined packing. Within this groove is seated an expansible member, preferably one having a plurality of bearing points cut on a radius contacting the conical inner faces of the respective ring sections which form the groove in the combined packing, to exert radial and axial pressure on said ring sections thereby holding them outwardly against the cylinder wall and laterally against the side walls of the groove.

Each ring section is split and when the ring sections are arranged in the packing groove the split ends thereof are disposed on opposite sides of the piston and the meeting ends of each ring section overlap. These overlapping end portions are provided with beveled or conical tongues which tongues are adapted to form a joint such as will seal the meeting ends of the ring sections. An oil groove is provided which terminates at a point spaced slightly from each of the meeting ends of the ring sections thereby preventing seepage therefrom between the separated ends of the ring sections.

The above objects and others together with details of the preferred construction will appear more fully from the following specification, accompanying drawings and appended claims in which my invention is defined.

In the drawings,—

Figure 1 is a horizontal section through a piston at the groove showing my packing therein.

Fig. 2 is a fragmentary side elevation of a piston provided with my improved packing.

Fig. 3 is a cross-sectional view taken on line 3—3 of Fig. 2.

Fig. 4 is a cross-sectional view taken on the same line of Fig. 2 as Fig. 3, showing an expansible ring locating member to exert pressure against the ring sections.

Fig. 5 is a fragment of a perspective of one of the ring sections showing the meeting ends.

Fig. 6 is a fragment of a perspective of the co-operating ring section showing its meeting ends.

Fig. 7 is a perspective of a fragment of one of the ring sections showing the notch to receive an end of the locating member.

Fig. 8 is an elevation of a fragment of an expansible ring locating member.

Figs. 9, 10 and 11 are cross-sectional views taken on the corresponding section lines of Fig. 8.

My improved packing comprises, as shown in the figures of the drawing, a pair of co-operating ring sections seated in a provided groove 10 of a piston 12, which piston is mounted in cylinder 14. This piston may be provided with such a number of rings as is found most suitable and the rings may be of such size as is desired and the groove may be made of any suitable width.

My ring sections are indicated as 16 and 18. Section 16 is triangular in cross-section and has a cross-sectional area substantially in the form of a right-angle triangle. Section 18 has a cross-sectional area in the form of a polygon. The two ring sections have beveled or conical meeting faces 16a and 18a respectively. The conical meeting face 16a of ring section 16 is preferably formed by a portion of the diagonal face of such ring section. The co-operating face 18a of ring section 18 is a conical outer face formed on the ring section, which intersects the outer periphery of such ring section and also intersects a beveled or conical inner periphery 18b of said ring section 18.

When the ring sections are held radially outwards either by virtue of their inherent expansive tendency, as appears in Fig. 3, or by means of an expansive member 20, as illustrated in Fig. 4, the contact formed between the face 16a and 18a tends to cause such ring sections to expand axially within the groove, thereby wedging the ring sections tightly against the side walls of the groove and form leak-proof joints at such points.

The conical inner face 18b of ring section 18 intersects the conical face of ring section 16 and co-operates with the lower portion thereof to form a grooved inner face for the combined packing. An expansible spring member 20 is seated within this groove and exerts pressure outwardly on the ring sections and laterally by virtue of engagement with the conical inner faces of said sections whereby the ring sections are held outwardly against the cylinder wall and laterally against the side walls of the groove.

When my improved packing is used with a spring member such as member 20 a preferred form of construction is to provide a ring section 18 somewhat smaller in cross-sectional area than the gap in the groove it is to fill. The two rings 16 and 18 are, therefore, held outwardly against the cylinder wall, each ring having a bearing thereagainst. Ring section 18 has a relatively smaller cylinder wall engaging face than ring section 16 and wears more rapidly during the initial period of wear so as to quickly conform to the out-of-round condition of the cylinder should such exist. After an initial wearing period the two ring sections come into contact upon their conical faces 16a and 18a.

This spring member 20 may be of different types of construction. In Fig. 4 member 20 is illustrated as being in the form of a round spring wire. This spring member is preferably corrugated as shown in Fig. 1, and exerts substantially uniform outward pressure on the ring sections to hold them at all points against the cylinder wall, and further, exerts a similar lateral pressure on the ring sections by virtue of its engagement with the conical inner faces thereof. As a result the ring sections are held closely against the side walls of the groove and at the same time are held closely outwardly against the cylinder wall.

In Figs. 8 to 11 inclusive I have shown a spring structure of the same general corrugated form and shaped originally from a round ring. This spring structure when formed has a cross-sectional area at different points throughout its length, as appears in Figs. 9 to 11 inclusive. At those points where it engages the bottom of the groove in the piston it is convex, as appears in Fig. 9, and at those points on the opposite side of the structure where it engages the packing rings it is also convex, as appears in Fig. 10. Intermediate these bearing points the spring is flattened as appears in Fig. 11. This type of spring is particularly suitable in that it presents at its respective bearing points a relatively large convex surface and exerts a substantially uniform pressure against the packing rings.

I prefer to provide each split ring section with stepped overlapping meeting ends, as shown in Figs. 5 and 6. The overlapping end portions have beveled or conical meeting faces which are substantially parallel the conical inner faces of the respective ring sections. These overlapping end portions are of a different length as shown in Fig. 1, so that a gap is formed between the end of the lower tongue portion and the opposite shoulder of the meeting end of the ring.

The spring member 20 is turned outwardly at one end as at 30 to engage in the gap between the opposed ends of one of the ring sections such as 16. The co-operating ring section is provided with a notch or recess 32 which registers with the gap in the first ring section. The outwardly-turned end 30 of the spring member engages in the gap of the one ring section and also in this notch 32 of the co-operating ring section. The ring sections are thus held against relative rotation in the packing groove. The meeting ends of the two ring sections are preferably disposed at opposite sides of the piston.

I cut away one ring section at the outer extremity of its inner conical face to form an oil groove 34. This ring section is cut away throughout its length to a point spaced slightly from the split therein, as shown in Fig. 2. This oil groove, therefore, serves the purpose of an oil groove without permitting seepage from the groove between the separated ends of the ring section.

What I claim is:

1. In piston packing, a piston having a groove for packing, a pair of expansible co-operating packing rings in said groove, said rings having conical meeting faces and conical inner faces, which conical inner faces form a groove on the inner periphery of the combined packing, said ring sections being of such cross-sectional area that when initially installed in the packing groove a slight annular gap exists between the conical meeting faces thereof, the ring sections adapted to wear within a limited period of use to close such gap.

2. In piston packing, a piston having a groove for packing, a pair of expansible co-operating packing rings in said groove, said rings having conical meeting faces slidably engaged to wedge the said sections against the side walls of the groove upon relative radial movement of one section relative to the other, and conical inner faces, forming a groove on the inner periphery of the combined packing, and a spring member seated in said groove to exert pressure on said ring sections.

3. In piston packing, a piston having a groove for packing, a pair of expansible co-operating packing rings in said groove, said rings having conical meeting faces and conical inner faces, which conical inner faces form a groove on the inner periphery of the combined packing, a spring member seated in said groove to exert pressure on said ring sections and engaging the ring sections to prevent relative rotation, one of said rings having its conical meeting face and conical inner face in substantially the same plane.

4. In piston packing, a piston having a groove for packing, packing in said groove comprising a pair of split co-operating ring sections having conical meeting faces and conical inner faces, which conical inner faces form a groove on the inner periphery of the combined packing, a split spring member seated in said groove having one end engaging one of the ring sections at the split and a recess formed in the co-operating ring section to prevent relative rotation of said ring sections.

5. In piston packing, a piston having a groove for packing, packing in said groove comprising a pair of split expansible ring sections having conical meeting faces, one of said ring sections being generally triangular in cross-section and having a conical inner face, the other ring section having an outer conical face engaging the outer annular portion of the inner conical face of the first ring section, and an inner conical face intersecting its outer conical face and forming with the inner annular portion of the inner conical face of the first ring section a groove on the inner periphery of the combined packing.

6. In piston packing, a piston having a groove for packing, packing in said groove comprising a plurality of split expansible ring sections having conical meeting faces and conical inner faces which form a grooved inner face for the combined packing, and an expansible member disposed in said groove to exert radial and axial pressure on said packing rings.

7. In piston packing, a piston having a groove for packing, packing in said groove comprising a pair of cooperating ring sections having conical inner faces which form an annular grooved inner periphery for the combined packing and an expansible spring member seated in said groove and shaped to seat at a plurality of spaced-apart points against the packing ring sections and against the bottom of the groove in the piston, said expansible spring member having convex surfaces bearing against the packing rings and against the bottom of the groove in the piston and provided intermediate said convex bearing points with flat portions.

8. In piston packing, a piston having a groove for packing, packing in said groove comprising a pair of ring sections having conical meeting surfaces, one of said sections being substantially triangular in cross-section, and having a conical inner face, the second ring section having a cylinder-engaging face and an outer conical face intersecting said cylinder-engaging face and forming a meeting face to co-act with the conical face of the first ring section and an inner conical face which intersects the outer conical face and forms a conical face for the ring section which co-operates with the inner annular portion of the conical face of the first ring section to form an inner grooved periphery for the combined packing, and an expansible member disposed within the groove of said inner face to exert outward pressure on the two packing rings, said second ring section having such a cross-sectional area that when the combined packing is initially installed each ring section is held outwardly independently against the cylinder wall.

In testimony whereof, I sign this specification.

WALLACE MATER HOULDSWORTH.